United States Patent
Kawano et al.

(10) Patent No.: US 10,712,244 B2
(45) Date of Patent: Jul. 14, 2020

(54) SPECIMEN STAINING APPARATUS AND SPECIMEN STAINING METHOD

(71) Applicant: OLYMPUS CORPORATION, Hachioji-shi, Tokyo (JP)

(72) Inventors: Yoshihiro Kawano, Tokyo (JP); Kei Tsuyuki, Tokyo (JP); Asuka Yamamoto, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 181 days.

(21) Appl. No.: 15/814,719

(22) Filed: Nov. 16, 2017

(65) Prior Publication Data

US 2018/0073963 A1 Mar. 15, 2018

Related U.S. Application Data

(63) Continuation of application No. PCT/JP2016/064061, filed on May 11, 2016.

(30) Foreign Application Priority Data

May 26, 2015 (JP) ................................. 2015-106373

(51) Int. Cl.
*G01N 1/00* (2006.01)
*G01N 1/31* (2006.01)
(Continued)

(52) U.S. Cl.
CPC ............ *G01N 1/312* (2013.01); *B01L 3/5027* (2013.01); *B01L 2300/0822* (2013.01);
(Continued)

(58) Field of Classification Search
CPC ........................................................ G01N 1/00
See application file for complete search history.

(56) References Cited

U.S. PATENT DOCUMENTS 5,273,905 A * 12/1993 Muller .................. G01N 1/312
422/547
6,534,008 B1   3/2003 Angros
(Continued)

FOREIGN PATENT DOCUMENTS

JP    2011027727 A    2/2011
JP    2014533823 A    12/2014
(Continued)

OTHER PUBLICATIONS

Extended European Search Report (EESR) dated Jan. 7, 2019 issued in counterpart European Application No. 16799819.4.
(Continued)

*Primary Examiner* — Jyoti Nagpaul
(74) *Attorney, Agent, or Firm* — Holtz, Holtz & Volek PC

(57) ABSTRACT

Provided is a specimen staining apparatus that includes a gap-forming member arranged to form a gap having a thickness that induces capillary action, the gap being formed above a mounting surface of a slide glass having a specimen mounted thereon; and a chemical solution supply unit that supplies a chemical solution for staining the specimen to the gap between the gap-forming member and the mounting surface so that the chemical solution spreads within the gap due to capillary action and is evenly supplied to the specimen placed on the mounting surface.

8 Claims, 8 Drawing Sheets

(51) Int. Cl.
*B01L 3/00* (2006.01)
*G01N 1/44* (2006.01)

(52) U.S. Cl.
CPC ........ *B01L 2400/0478* (2013.01); *G01N 1/44* (2013.01); *G01N 2001/317* (2013.01)

(56) References Cited

U.S. PATENT DOCUMENTS

| | | |
|---|---|---|
| 6,673,620 B1 | 1/2004 | Loeffler et al. |
| 6,855,292 B2 | 2/2005 | Angros |
| 7,250,301 B2 | 7/2007 | Angros |
| 7,318,913 B2 | 1/2008 | Loeffler et al. |
| 7,476,362 B2 | 1/2009 | Angros |
| 7,622,077 B2 | 11/2009 | Angros |
| 7,632,461 B2 | 12/2009 | Angros |
| 8,007,720 B2 | 8/2011 | Angros |
| 8,007,721 B2 | 8/2011 | Angros |
| 8,052,927 B2 | 11/2011 | Angros |
| 8,071,023 B2 | 12/2011 | Angros |
| 8,092,742 B2 | 1/2012 | Angros |
| 8,173,068 B2 | 5/2012 | Loeffler et al. |
| 8,313,694 B2 | 11/2012 | Angros |
| 8,329,100 B2 | 12/2012 | Angros |
| 8,354,058 B2 | 1/2013 | Angros |
| 8,361,388 B2 | 1/2013 | Angros et al. |
| 8,541,244 B2 | 9/2013 | Angros et al. |
| 8,574,494 B2 | 11/2013 | Angros |
| 8,696,988 B2 | 4/2014 | Angros |
| 8,911,815 B2 * | 12/2014 | Kram ............... G01N 1/312 422/65 |
| 9,176,033 B2 | 11/2015 | Angros |
| 9,354,145 B2 | 5/2016 | Angros et al. |
| 9,435,723 B2 | 9/2016 | Angros |
| 9,464,974 B2 | 10/2016 | Angros |
| 9,606,034 B2 | 3/2017 | Angros |
| 9,719,895 B2 | 8/2017 | Angros et al. |
| 9,772,266 B2 | 9/2017 | Angros |
| 2007/0231889 A1 | 10/2007 | Angros |
| 2011/0150725 A1 | 6/2011 | Angros et al. |
| 2011/0229978 A1 | 9/2011 | Angros et al. |
| 2012/0201723 A1 | 8/2012 | Loeffler et al. |
| 2014/0024134 A1 | 1/2014 | Angros et al. |
| 2014/0315256 A1 | 10/2014 | Dockrill et al. |
| 2016/0274007 A1 | 9/2016 | Angros et al. |
| 2016/0370390 A1 | 12/2016 | Angros |
| 2017/0023449 A1 | 1/2017 | Angros |
| 2017/0328820 A1 | 11/2017 | Angros et al. |

FOREIGN PATENT DOCUMENTS

| | | |
|---|---|---|
| WO | 0063670 A1 | 10/2000 |
| WO | 2006127852 A2 | 11/2006 |
| WO | 2013071352 A1 | 5/2013 |

OTHER PUBLICATIONS

International Search Report (ISR) and Written Opinion dated Aug. 2, 2016 issued in International Application No. PCT/JP2016/064061.

* cited by examiner

SPECIMEN STAINING APPARATUS AND SPECIMEN STAINING METHOD

CROSS-REFERENCE TO RELATED APPLICATIONS

This is a continuation of International Application PCT/JP2016/064061 which is hereby incorporated by reference herein in its entirety.

This application is based on Japanese Patent Application No. 2015-106373, the contents of which are incorporated herein by reference.

TECHNICAL FIELD

The present invention relates to a specimen staining apparatus and a specimen staining method.

BACKGROUND ART

Heretofore, an apparatus that sequentially supplies, to specimens, reagents needed for staining from a reagent module in which reagents are packaged for each specimen has been known (for example, refer to PTL 1).

This apparatus defines a space above a specimen and supplies the reagent to the specimen by spraying the reagent from above the space.

CITATION LIST

Patent Literature

{PTL 1}
U.S. Pat. No. 8,354,058 Specification

SUMMARY OF INVENTION

An aspect of the present invention provides a specimen staining apparatus comprising a gap-forming member arranged to form a gap that induces capillary action, the gap being formed above a mounting surface of a slide glass having a specimen mounted thereon; and a chemical solution supply unit that supplies a chemical solution for staining the specimen to the gap between the gap-forming member and the mounting surface.

Another aspect of the present invention provides a specimen staining method comprising placing a gap-forming member so that a gap that induces capillary action is formed between the gap-forming member and a mounting surface of a slide glass having a specimen mounted thereon, and supplying a chemical solution for staining the specimen to the gap between the gap-forming member and the mounting surface.

DESCRIPTION OF EMBODIMENTS

A specimen staining apparatus 1 and a specimen staining method according to one embodiment of the present invention will now be described with reference to the drawings.

Figure 1:
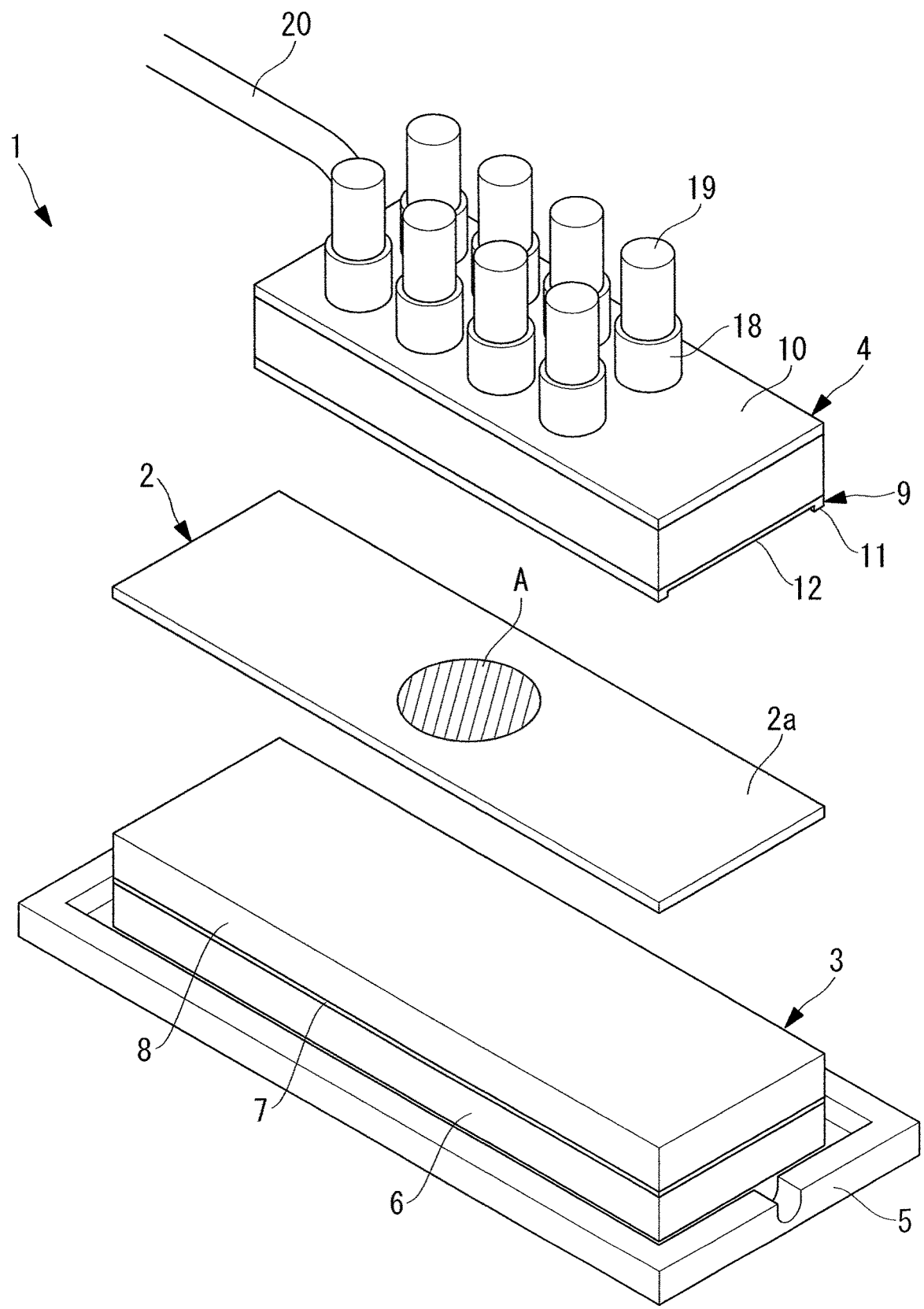
FIG. 1 is an exploded perspective view of a specimen staining apparatus according to one embodiment of the present invention.
Figure 2:
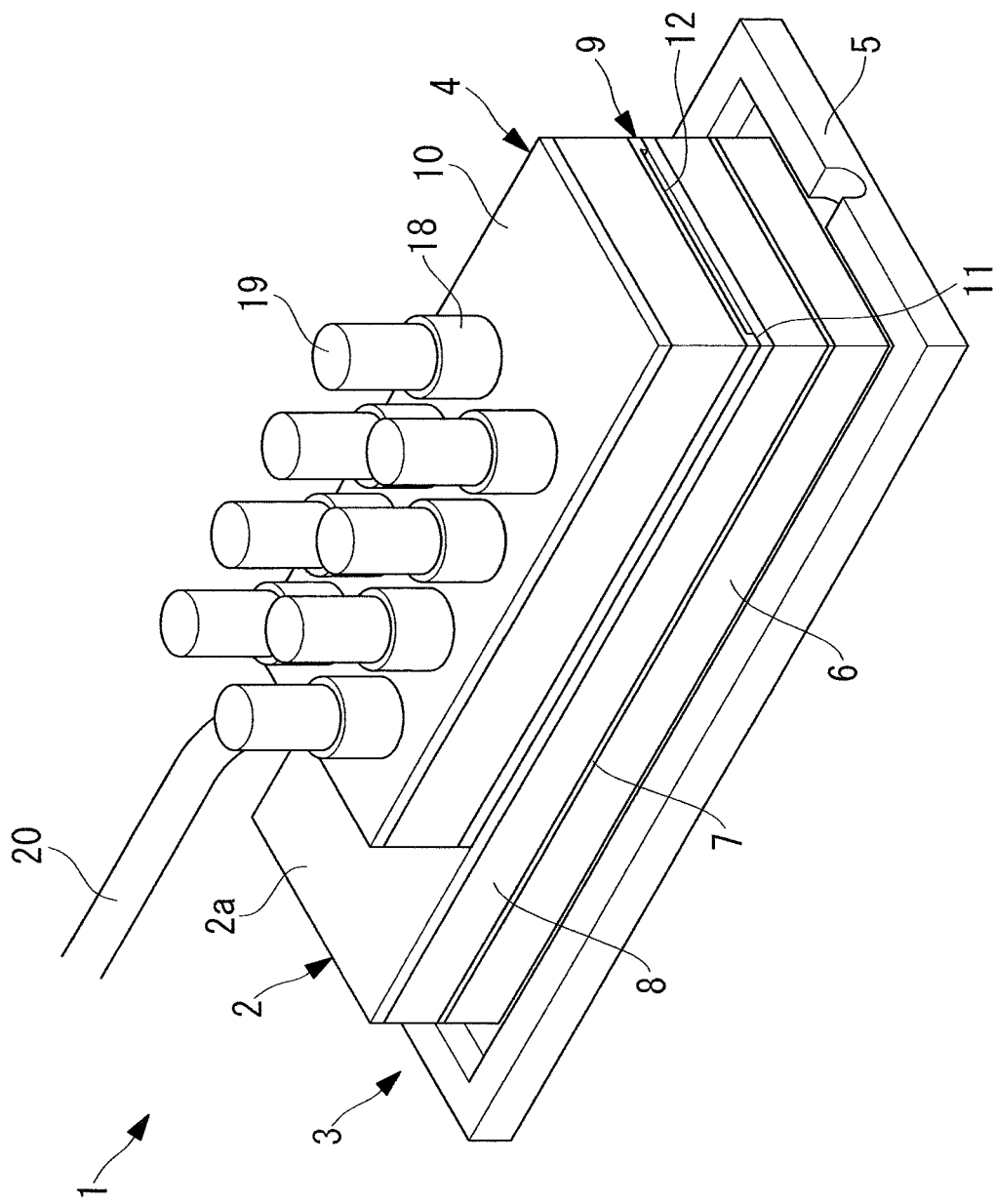
FIG. 2 is a perspective view of the specimen staining apparatus illustrated in FIG. 1.

As illustrated in FIGS. 1 and 2, the specimen staining apparatus 1 of this embodiment is equipped with a base unit 3 on which a slide glass 2 with a specimen A thereon is to be placed, and an apparatus body 4 to be placed on an upper surface (mounting surface) 2a of the slide glass 2 placed on the base unit 3.

The base unit 3 is equipped with a receiving pan 5, a heater holding member 6 fixed inside the receiving pan 5, a heater (heating means) 7 fixed to the upper surface of the heater holding member 6, and a heat-diffusing plate 8 fixed to the upper surface of the heater 7 to diffuse the heat from the heater 7.

The apparatus body 4 is equipped with a plate (gap-forming member) 9 to be brought into contact with the upper surface 2a of the slide glass 2, and a chemical solution supply unit 10 fixed to the upper surface of the plate 9.

The heater 7 supported on the upper surface of the heater holding member 6 is a plate heater having a thin plate shape, and the heat generated from the heater 7 is diffused upward by the heat-diffusing plate 8. The heat-diffusing plate 8 has a flat upper surface on which the rear surface of the slide glass 2 makes close contact. The heat from the heater 7 diffused by the heat-diffusing plate 8 passes through the slide glass 2 so that the specimen A on the upper surface 2a of the slide glass 2 can be heated.

Figure 3:
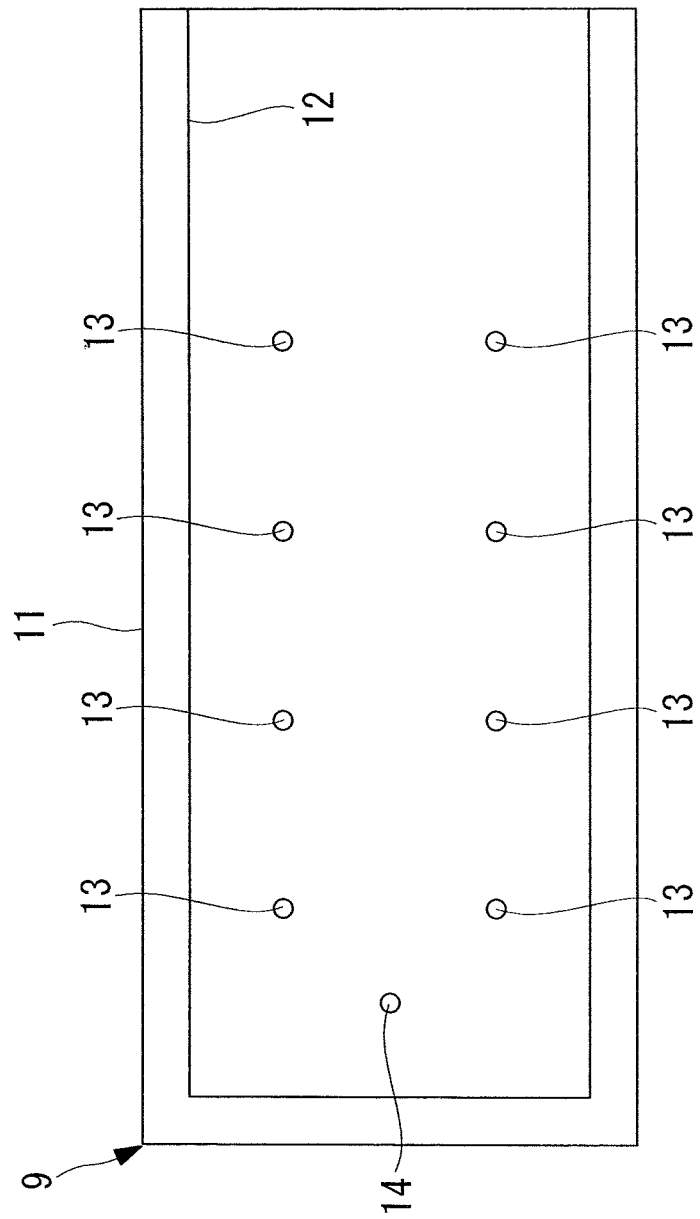
FIG. 3 is a diagram illustrating a rear surface of an apparatus body of the specimen staining apparatus illustrated in FIG. 1.

As illustrated in FIG. 3, the rear surface of the plate 9 of the apparatus body 4 is equipped with a contact portion 11 that contacts the upper surface 2a of the slide glass 2, and a recessed portion 12 set back with respect to the contact portion 11. The contact portion 11 is provided at a peripheral portion extending along two long sides and one short side of the plate 9, and is positioned to surround the three sides of the recessed portion 12 other than one short side.

The recessed portion 12 is set back with respect to the contact portion 11 by 100 μm to 200 μm. In this manner, when the plate 9 is placed on the upper surface 2a of the slide glass 2, the contact portion 11 contacts the upper surface 2a of the slide glass 2, and the recessed portion 12 is arranged such that a gap having a substantially even spacing of 100 μm to 200 μm is formed by the recessed portion 12 with respect to the upper surface 2a of the slide glass 2.

The recessed portion 12 has multiple discharge ports 13, through which a chemical (chemical solution) X in the chemical solution supply unit 10 described below is discharged. The recessed portion 12 also has a discharge port 14 for a washing solution or the like, through which a washing fluid is supplied to the gap.

Figure 4:
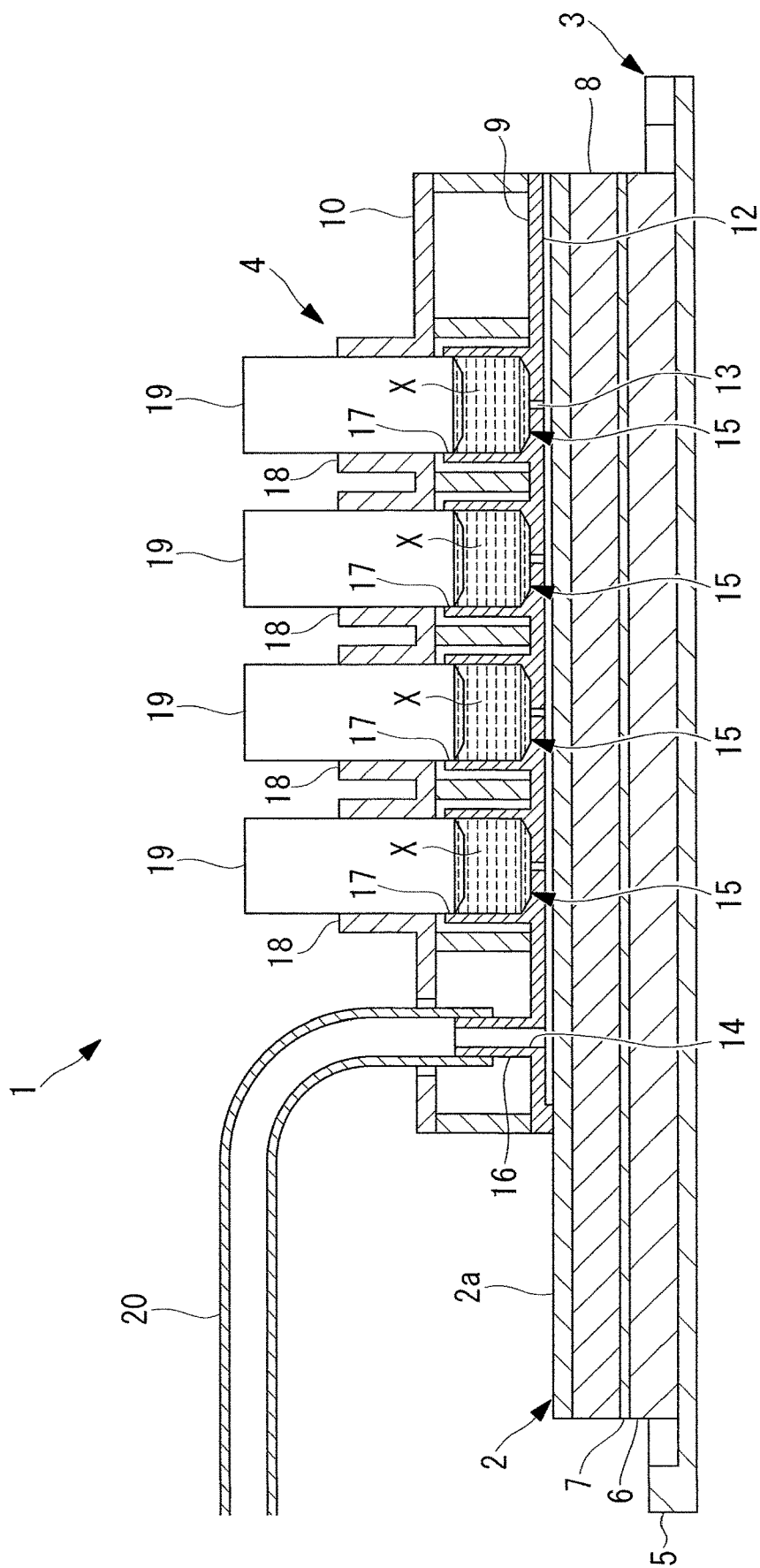
FIG. 4 is a longitudinal sectional view of the specimen staining apparatus illustrated in FIG. 1.

As illustrated in FIG. 4, multiple chemical containers (tanks) 15 that are located at the positions corresponding to the discharge ports 13 and that store the chemical X, and a connecting portion 16 that connects a pipe 20 to the discharge port 14 for a washing solution or the like are provided on the surface of the plate 9 opposite the recessed portion 12. The chemical containers 15 are each formed to have a cylindrical shape having a particular cross-sectional shape.

As illustrated in FIG. 4, when the plate 9 is placed so that the surface provided with the chemical containers 15 faces upward and the surface provided with the recessed portion 12 faces downward, the chemical containers 15 each constitute a container that has an opening portion 17 in the upper part and the discharge port 13 open at the bottom. Each of the chemical containers 15 is configured to contain the chemical X needed for staining, for example, a primary antibody, a secondary antibody, a reagent with a linker attached to DAB, or hematoxylin.

As illustrated in FIG. 4, the chemical solution supply unit 10 is equipped with cylindrical piston holding portions 18 fixed to the positions coincident with the positions of the chemical containers 15 on the plate 9, and piston members (pressurizing means) 19 movably inserted into the piston holding portions 18 in the axis direction. The inner diameter of the piston holding portions 18 is substantially the same as the inner diameter of the chemical containers 15 and is slightly larger than the outer diameter of the piston members 19.

The lower ends of the piston members 19 supported by the piston holding portions 18 are respectively inserted into the chemical containers 15 that correspond to the piston holding portions 18. As a result, when the piston members 19 are pressed down with respect to the piston holding portions 18, the chemical X in the chemical containers 15 is pressurized by the piston members 19 with the chemical containers 15 functioning as cylinders, and is discharged into the recessed portion 12 from the discharge ports 13 formed in the plate 9.

The discharge ports 13 and 14 are formed to be small enough to retain the chemical X inside the chemical containers 15 by the surface tension when the piston members 19 are not pressed down and to thereby prevent leakage from the discharge ports 13. In order to further reliably prevent leakage, valves that open by application of pressure may be provided to the discharge ports 13.

Examples of the washing fluid include xylene for dissolving paraffin, EDTA and citrates for activating antigens, PBS, alcohol, and air. These fluids for washing can be supplied separately to the discharge port 14 for a washing solution or the like by switching the valve or pump (not illustrated) via the same pipe 20.

The valve and pump used for supplying the washing fluid via the pipe 20 constitute a washing fluid supplying means (not illustrated), and the valve and pump used for supplying air via the pipe 20 constitute a washing fluid discharging means (not illustrated).

A specimen staining method that uses the specimen staining apparatus 1 of this embodiment configured as such will now be described with reference to the drawings.

In order to perform immunostaining on the specimen A by using the specimen staining apparatus 1 of this embodiment, the slide glass 2 with the specimen A embedded in paraffin placed on the mounting surface 2a is placed on the upper surface of the heat-diffusing plate 8, and the apparatus body 4 is placed on the slide glass 2.

In this state, when xylene is discharged from the discharge port 14 for a washing solution or the like via the pipe 20, xylene is supplied to the gap between the upper surface 2a of the slide glass 2 and the recessed portion 12 of the plate 9 and infiltrates the specimen. Since the gap formed between the upper surface 2a of the slide glass 2 and the recessed portion 12 of the plate 9 has an extremely small spacing of 100 μm to 200 μm, the xylene supplied to the gap rapidly and thoroughly spreads within the gap due to capillary action and infiltrates the specimen A. Thus, a large amount of xylene is not needed.

In this state, the heater 7 is turned on to heat the specimen A to 60° C. with the heat from the heater 7. Since dissolution of paraffin is accelerated as a result, PBS is discharged from the discharge port 14 for a washing solution or the like instead of xylene after the passage of a particular length of time so as to wash the specimen A. Then, air is discharged from the discharge port 14 for a washing solution or the like to purge PBS. The xylene, PBS, etc., that have been purged are discharged from the open portion where the plate 9 and the upper surface 2a of the slide glass 2 do not make contact, are received by the receiving pan 5 below, and are then ejected to the exterior.

Next, EDTA or a citrate is discharged from the discharge port 14 for a washing solution or the like, and is heated to 90° C. by using the heater 7 for activation. Then PBS is discharged from the discharge port 14 for a washing solution or the like to wash the specimen A. Subsequently, air is discharged from the discharge port 14 for a washing solution or the like to purge PBS.

Figure 5:
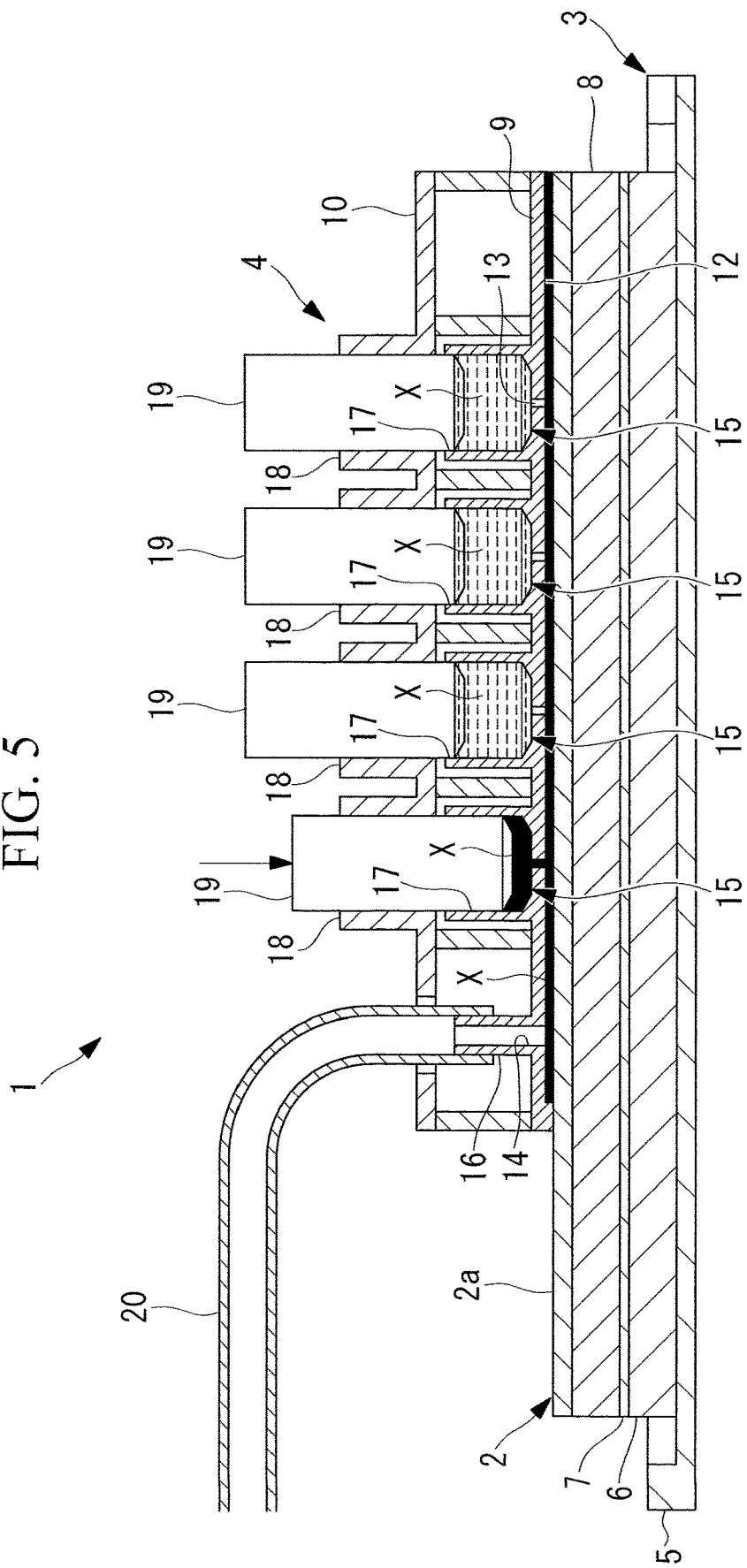
FIG. 5 is a longitudinal sectional view illustrating a state in which a chemical is supplied from one chemical container of the specimen staining apparatus illustrated in FIG. 4.

Next, as illustrated in FIG. 5, while the specimen A is heated to 37° C. with the heater 7, the piston member 19 of the chemical container 15 containing a primary antibody is pressed down. As a result, the primary antibody contained in the chemical container 15 corresponding to the pressed piston member 19 is pressurized and discharged from the discharge port 13 into the recessed portion 12. In this case also, the discharged primary antibody rapidly and thoroughly spreads within the gap having an extremely small spacing of 100 μm to 200 μm between the upper surface 2a of the slide glass 2 and the recessed portion 12 of the plate 9 due to capillary action, and is supplied to the specimen A.

In other words, an advantage is offered in that although the amount of the primary antibody supplied to the gap is small, the primary antibody rapidly and thoroughly spreads due to capillary action, and thus the amount of the expensive chemical X used can be reduced. Another advantage is that, compared to when the chemical X is sprayed in a large space, the chemical X can be more reliably supplied to the specimen A.

Figure 6:
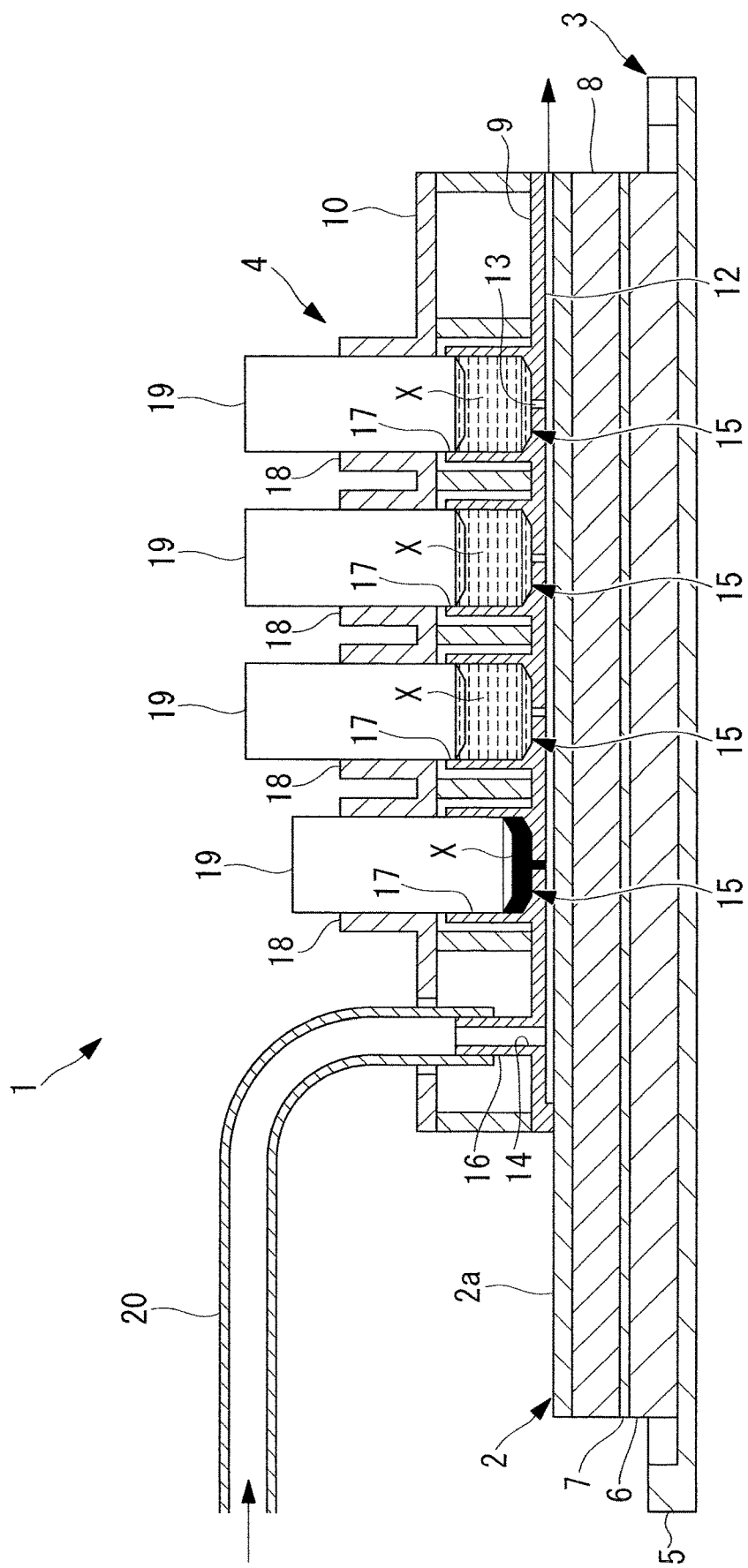
FIG. 6 is a longitudinal sectional view illustrating a state in which the gap is washed with a washing fluid after the state illustrated in FIG. 5.

As illustrated in FIG. 6, after the passage of a particular length of time (for example, 20 minutes), PBS and air are supplied to the gap from the discharge port 14 for a washing solution or the like via the pipe 20 so as to wash the specimen A.

Figure 7:
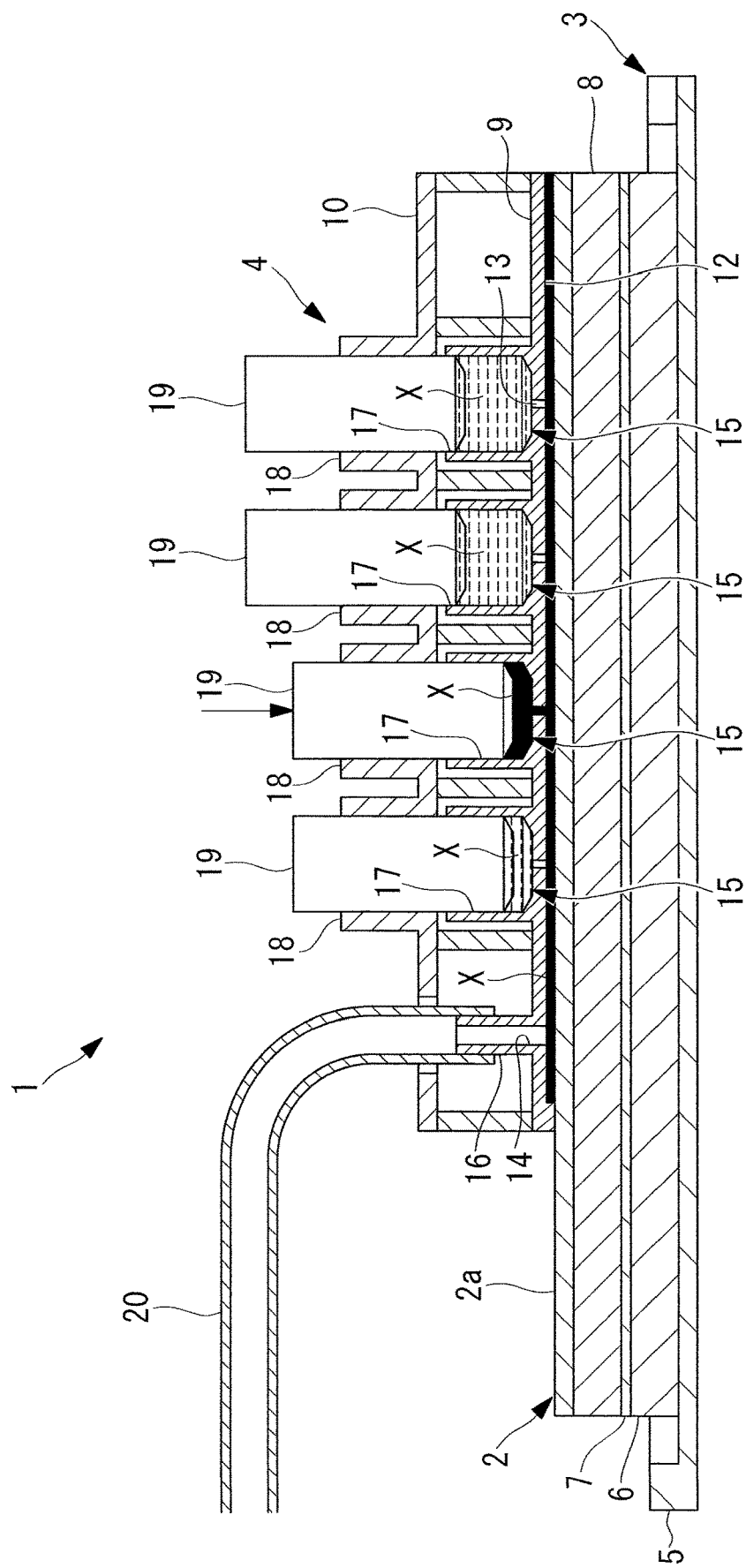
FIG. 7 is a longitudinal sectional view illustrating a state in which a chemical is supplied from another chemical container of the specimen staining apparatus illustrated in FIG. 4.

Next, as illustrated in FIG. 7, the piston member 19 of another chemical container 15 containing a secondary antibody is pressed down, and heating to 37° C. is conducted by using the heater 7. In this case also, the secondary antibody contained in the chemical container 15 corresponding to the pressed piston member 19 is pressurized and is discharged into the recessed portion 12 from the discharge port 13. The discharged secondary antibody rapidly and thoroughly spreads within the gap due to capillary action, and is supplied to the specimen A.

After the passage of a particular length of time (for example, 20 minutes), PBS and air are supplied to the gap from the discharge port 14 for a washing solution or the like so as to wash the specimen A.

Next, the piston member 19 of the chemical container 15 containing a reagent with a linker attached to DAB is pressed down, and heating to 37° C. is conducted by using the heater 7.

After passage of about 10 minutes, PBS and air are supplied to the gap from the discharge port 14 for a washing solution or the like so as to wash the specimen A.

Next, the piston member 19 of the chemical container 15 containing hematoxylin is pressed down, and heating to 37° C. is conducted by using the heater 7.

After passage of about 30 seconds, PBS and air are supplied to the gap from the discharge port 14 for a washing solution or the like so as to wash the specimen A.

Then, air is discharged from the discharge port 14 for a washing solution or the like to purge the reagent on the specimen A. Then, supplying of alcohol from the discharge port 14 for a washing solution or the like and purging with air are repeated.

Lastly, xylene is introduced from the discharge port 14 for a washing solution or the like to impregnate the specimen A for 3 minutes to end staining.

The specimen staining apparatus 1 and the specimen staining method of this embodiment offer an advantage in that because a gap of 100 µm to 200 µm is formed near the specimen A and the chemical X is supplied to the gap to cause the chemical X to spread within the gap due to capillary action, the chemical X can more reliably act on the specimen A by using a small amount of the chemical X.

The specimen staining apparatus 1 of this embodiment is not limited to the structure described above. For example, as illustrated in FIG. 8, the specimen staining apparatus 1 may be equipped with a container body (gap-forming member) 21 that contains the slide glass 2 with the specimen A thereon, and a cover 23 that covers an upper opening 22 of the container body 21.

Figure 8:
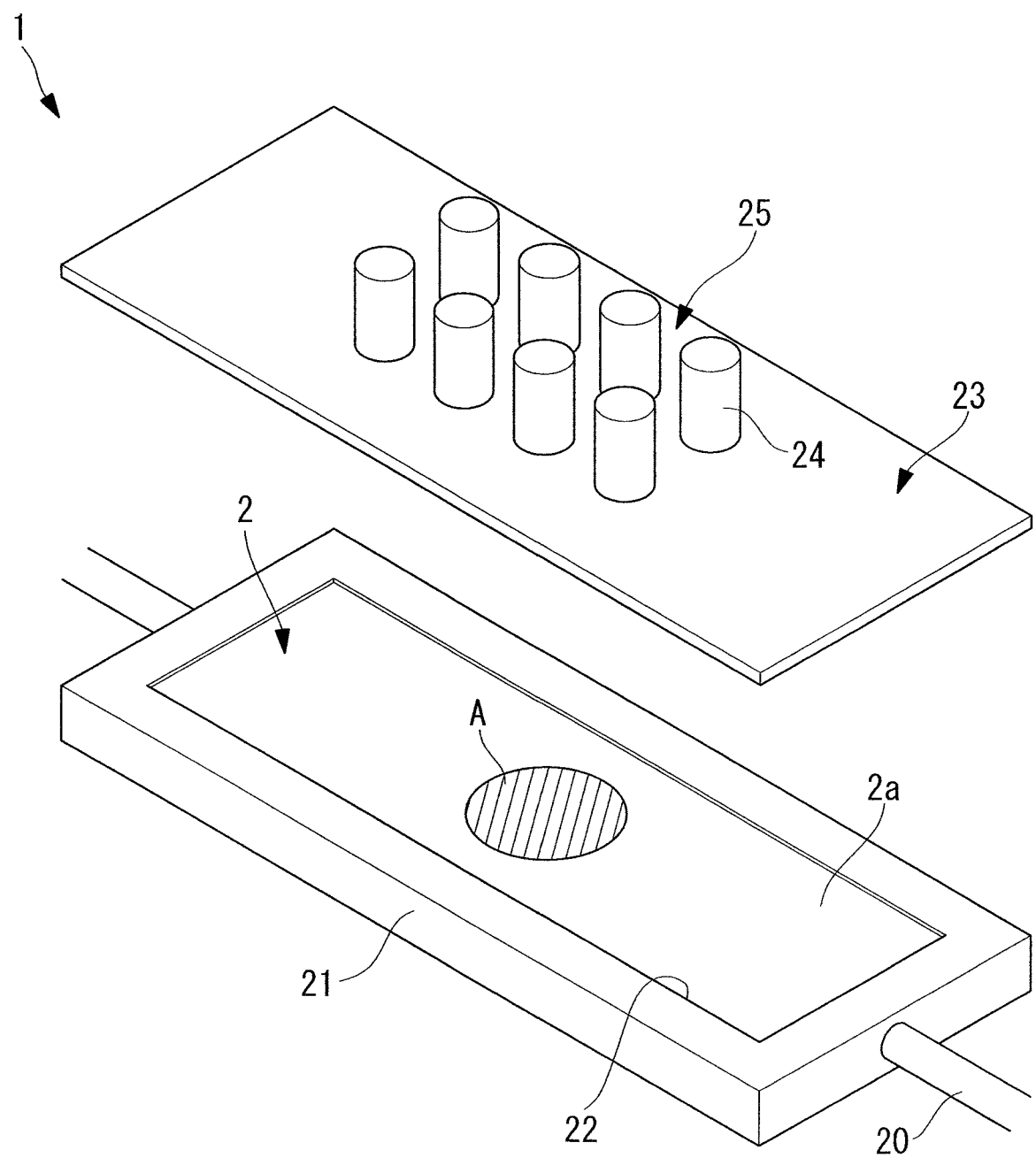
FIG. 8 is an exploded perspective view of a modification of the specimen staining apparatus illustrated in FIG. 1.

In the example illustrated in FIG. 8, the pipe 20 for supplying or discharging a washing fluid or air is connected to the container body 21. The height of the peripheral portion of the container body 21 may be designed to form a gap having a spacing of 100 µm to 200 µm between the rear surface of the cover 23 and the upper surface 2a of the slide glass 2 when the cover 23 is placed in position.

A chemical solution supply unit 25 provided on the cover 23 may be configured to contain the chemical X in bag-shaped chemical containers 24 formed of a flexible material so that the chemical X is discharged from the discharge ports formed in the lower surface of the cover 23 by being compressed by squashing the chemical containers 24. The cover 23 may be composed of a transparent material.

The specimen staining apparatus 1 of this embodiment may be equipped with a pressure-reducing means (not illustrated) that reduces the pressure in the gap between the upper surface 2a of the slide glass 2 and the plate 9 or the cover 23.

In this manner, the chemical X is supplied to the gap after a reduced pressure state is created in the gap by operation of the pressure-reducing means, and thus the chemical X can more rapidly spread within the gap.

The above-described embodiment leads to the following invention.

An aspect of the present invention provides a specimen staining apparatus comprising a gap-forming member arranged to form a gap that induces capillary action, the gap being formed above a mounting surface of a slide glass having a specimen mounted thereon; and a chemical solution supply unit that supplies a chemical solution for staining the specimen to the gap between the gap-forming member and the mounting surface.

According to this aspect, when the gap-forming member is arranged to oppose the mounting surface of the slide glass having the specimen mounted thereon, a gap is formed between the gap-forming member and the mounting surface.

Since the gap formed thereby has a thickness sufficient to induce capillary action, once a chemical solution for staining the specimen is supplied to the gap by operation of the chemical solution supply unit, the chemical solution spreads within the gap due to capillary action and is evenly supplied to the specimen placed on the mounting surface. In other words, even when the total amount of the chemical solution supplied to the gap is small, the chemical solution can be thinly, widely, and rapidly spread due to capillary action. As a result, the amount of the chemical solution can be reduced, and the chemical solution can rapidly spread throughout the specimen even if the amount of the chemical solution is small.

In the aspect described above, the specimen staining apparatus may further comprise a washing fluid supplying means for supplying a washing fluid to the gap between the gap-forming member and the mounting surface, and a washing fluid discharging means for discharging, from the gap, the washing fluid supplied by the washing fluid supplying means.

In this manner, a washing fluid, such as xylene, i.e., a solvent that dissolves paraffin in which the specimen is embedded, can be supplied by the washing fluid supplying means, and the washing fluid in which paraffin is dissolved can be discharged through the washing fluid discharging means. Moreover, although two or more chemicals are used to stain the specimen, the specimen may be washed by supplying a washing fluid, such as alcohol or air, by the washing fluid supply means after one chemical is supplied and has acted on the specimen, and then the washing fluid, which being used for washing, may be discharged by the washing fluid discharging means. In this manner, other chemicals can be sequentially supplied to the gap.

In the aspect described above, the specimen staining apparatus may further comprise a heating means for heating the specimen placed on the slide glass.

In this manner, the staining process can be accelerated by heating the specimen placed on the slide glass by operation of the heating means. Furthermore, in the washing process that involves dissolving paraffin, heating the specimen promotes dissolution of paraffin and accelerates the washing process.

In the aspect described above, the gap-forming member may be equipped with at least one tank that contains the chemical solution, and a pressurizing means for pressurizing the chemical solution in the tank; and the tank may have a discharge port through which the chemical solution inside the tank is discharged into the gap when the chemical solution is pressurized.

In this manner, when the pressurizing means is operated to pressurize the chemical solution in the tank, the chemical solution is pushed out from the discharge port and is supplied to the gap between the mounting surface and the cover. As a result, the chemical solution can be easily supplied to the gap.

In the aspect described above, the specimen staining apparatus may further comprise a pressure-reducing means for reducing the pressure in the gap.

In this manner, the chemical solution is supplied to the gap after a reduced pressure state is created in the gap by operation of the pressure-reducing means, and thus the chemical solution can more rapidly spread within the gap.

Another aspect of the present invention provides a specimen staining method comprising placing a gap-forming member so that a gap that induces capillary action is formed between the gap-forming member and a mounting surface of a slide glass having a specimen mounted thereon, and supplying a chemical solution for staining the specimen to the gap between the gap-forming member and the mounting surface.

REFERENCE SIGNS LIST 1 specimen staining apparatus
2 slide glass
2a upper surface (mounting surface)
7 heater (heating means)
9 plate (gap-forming member)
10, 25 chemical solution supply unit
13 discharge port
15, 24 chemical container (tank)
19 piston member (pressurizing means)
21 container body (gap-forming member)
A specimen
X chemical (chemical solution)

The invention claimed is:

1. A specimen staining apparatus comprising:
a gap-forming member arranged to form a gap that has a pre-set, fixed size and that induces capillary action, the gap being formed above a mounting surface of a slide glass having a specimen mounted thereon,
wherein the gap-forming member includes:
a plurality of tanks that contain different types of chemical solutions for staining the specimen; and
a plurality of pressurizing portions, each of the pressurizing portions pressurizing a respective one of the chemical solutions in a respective one of the plurality of tanks,
wherein each of the chemical solutions is supplied to the gap formed between the gap-forming member and the mounting surface, and
wherein each of the plurality of tanks includes a discharge port through which the chemical solution inside the tank is discharged into the gap when the chemical solution is pressurized.

2. The specimen staining apparatus according to claim 1, further comprising:
a washing fluid supplying portion that supplies a washing fluid to the gap formed between the gap-forming member and the mounting surface; and
a washing fluid discharging portion that discharges, from the gap, the washing fluid supplied by the washing fluid supplying portion.

3. The specimen staining apparatus according to claim 2, further comprising a heating portion that heats the specimen placed on the slide glass.

4. The specimen staining apparatus according to claim 1, further comprising a pressure-reducing portion that reduces a pressure in the gap.

5. The specimen staining apparatus according to claim 1, wherein the discharge port includes a valve that opens by application of pressure.

6. A specimen staining method comprising placing a gap-forming member so that a gap that has a pre-set, fixed size and that induces capillary action is formed between the gap-forming member and a mounting surface of a slide glass having a specimen mounted thereon, and supplying, from a plurality of tanks that contain different types of chemical solutions, the chemical solutions for staining the specimen to the gap formed between the gap-forming member and the mounting surface.

7. A specimen staining apparatus comprising:
container including an opening in which a slide glass having a specimen mounted thereon is placed;
a cover arranged on the opening of the container; and
a plurality of tanks that contain different types of chemical solutions for staining the specimen,
wherein the cover forms a gap having a pre-set, fixed size above an upper surface of the slide glass placed in the opening so as to induce capillary action within the gap, and
wherein each of the chemical solutions is discharged into the gap via a respective discharge port formed in the cover when the chemical solution is pressurized.

8. The specimen staining apparatus according to claim 7, wherein each of the plurality of tanks comprises a bag-shaped chemical container.

* * * * *